US009594174B2

(12) United States Patent
Goujon et al.

(10) Patent No.: US 9,594,174 B2
(45) Date of Patent: Mar. 14, 2017

(54) COMPUTING ROTATION DATA USING A GRADIENT OF TRANSLATIONAL DATA

(71) Applicant: WESTERNGECO L.L.C., Houston, TX (US)

(72) Inventors: Nicolas Goujon, Oslo (NO); Pascal Edme, Cambridge (GB); Artem Kashubin, East Grinstead (GB); Everhard Johan Muijzert, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 408 days.

(21) Appl. No.: 14/158,115

(22) Filed: Jan. 17, 2014

(65) Prior Publication Data

US 2014/0219055 A1  Aug. 7, 2014

Related U.S. Application Data

(60) Provisional application No. 61/868,429, filed on Aug. 21, 2013, provisional application No. 61/759,466, filed on Feb. 1, 2013.

(51) Int. Cl.
*G01V 1/16* (2006.01)
*G01V 1/30* (2006.01)
G01V 13/00 (2006.01)
G01V 1/18 (2006.01)

(52) U.S. Cl.
CPC ............... *G01V 1/162* (2013.01); *G01V 1/30* (2013.01); *G01V 1/185* (2013.01); *G01V 13/00* (2013.01); *Y10T 29/49002* (2015.01)

(58) Field of Classification Search
CPC .................. G01V 1/18; G01V 2210/1425
See application file for complete search history.

(56) References Cited

U.S. PATENT DOCUMENTS

| 2,705,314 A | 3/1955 | Gaby |
| 3,722,751 A | 3/1973 | Bisciglia |
| 3,930,218 A | 12/1975 | Hall, Jr. |
| 3,934,218 A | 1/1976 | Babb |
| 4,134,097 A | 1/1979 | Cowles |

(Continued)

FOREIGN PATENT DOCUMENTS

| EP | 0457644 A1 | 11/1991 |
| EP | 0736781 | 10/1996 |

(Continued)

OTHER PUBLICATIONS

Pham et al., "Investigation of ground rotational motions caused by direct and scattered P-waves from the Mar. 4, 2008 TAIGER explosion experiment", Journal of Seismology, Kluwer Academic Publishers, vol. 16, No. 4, Apr. 4, 2012, pp. 709-720.

(Continued)

Primary Examiner — Luke Ratcliffe
Assistant Examiner — Hovhannes Baghdasaryan

(57) ABSTRACT

Translational data in a first direction is measured by particle motion sensors contained in an elongated housing of a sensor device provided at an earth surface. The particle motion sensors are spaced apart along a second, different direction along a longitudinal axis of the elongated housing. Rotation data around a third direction is computed based at least in part on computing a gradient of the translational data with respect to the second direction.

35 Claims, 3 Drawing Sheets

(56) References Cited

U.S. PATENT DOCUMENTS

| | | |
|---|---|---|
| 4,163,206 A | 7/1979 | Hall, Jr. |
| 4,300,220 A | 11/1981 | Goff et al. |
| 4,334,296 A | 6/1982 | Hall, Jr. |
| 4,520,467 A | 5/1985 | Berni |
| 4,554,648 A | 11/1985 | Greer et al. |
| 4,558,439 A | 12/1985 | Gudesen |
| 4,599,713 A | 7/1986 | Rudaz |
| 4,890,264 A | 12/1989 | Crews |
| 4,979,150 A | 12/1990 | Barr |
| 4,996,675 A | 2/1991 | Beauducel |
| 5,010,531 A | 4/1991 | McNeel |
| 5,124,956 A | 6/1992 | Rice et al. |
| 5,214,614 A | 5/1993 | Baule |
| 5,365,491 A | 11/1994 | Sullivan et al. |
| 5,555,530 A | 9/1996 | Meehan |
| 5,621,699 A | 4/1997 | Rigsby et al. |
| 5,648,938 A | 7/1997 | Jakubowicz |
| 5,757,720 A | 5/1998 | Soubaras |
| 6,288,976 B1 | 9/2001 | Ambs |
| 6,314,371 B1 | 11/2001 | Monk |
| 6,330,512 B1 | 12/2001 | Thomas et al. |
| 6,353,577 B1 | 3/2002 | Orban et al. |
| 6,381,544 B1 | 4/2002 | Sallas et al. |
| 6,442,304 B1 | 8/2002 | Crawley et al. |
| 6,446,009 B1 | 9/2002 | Baeten et al. |
| 6,584,038 B2 | 6/2003 | Meunier |
| 6,607,050 B2 | 8/2003 | He et al. |
| 6,712,141 B1* | 3/2004 | Bussear ............... E21B 47/01 166/250.01 |
| 6,791,901 B1 | 9/2004 | Robertsson et al. |
| 6,814,160 B1* | 11/2004 | Scott .................. G01V 1/16 175/19 |
| 6,814,179 B2 | 11/2004 | Corrigan et al. |
| 6,868,356 B2 | 3/2005 | Nai et al. |
| 6,894,948 B2 | 5/2005 | Brittan et al. |
| 6,932,185 B2 | 8/2005 | Bary et al. |
| 6,961,283 B2 | 11/2005 | Kappius et al. |
| 7,082,079 B2 | 7/2006 | Woo |
| 7,142,481 B1 | 11/2006 | Metzbower |
| 7,286,938 B2 | 10/2007 | Amundsen et al. |
| 7,474,591 B2 | 1/2009 | Menard et al. |
| 7,520,467 B2 | 4/2009 | Gioffre et al. |
| 7,551,517 B2 | 6/2009 | Berg et al. |
| 7,656,746 B2 | 2/2010 | de Kok et al. |
| 7,916,576 B2 | 3/2011 | Beasley |
| 8,199,611 B2 | 6/2012 | Goujon |
| 8,520,469 B2 | 8/2013 | Ronnow et al. |
| 8,654,606 B2 | 2/2014 | Muyzert et al. |
| 8,665,671 B2 | 3/2014 | Muyzert |
| 8,712,694 B2 | 4/2014 | Edme |
| 9,103,930 B2 | 8/2015 | Paulson |
| 9,110,187 B2 | 8/2015 | Muyzert |
| 2004/0257913 A1* | 12/2004 | Ray ..................... G01V 1/16 367/188 |
| 2005/0034917 A1* | 2/2005 | Mathiszik ............ G01V 1/44 181/108 |
| 2007/0056795 A1* | 3/2007 | Cox ..................... G01V 1/52 181/111 |
| 2007/0104028 A1 | 5/2007 | van Manen et al. |
| 2008/0037369 A1* | 2/2008 | Hentati ............... E21B 47/182 367/83 |
| 2008/0049551 A1* | 2/2008 | Muyzert .............. G01V 1/364 367/24 |
| 2008/0225641 A1 | 9/2008 | van Manen et al. |
| 2009/0012711 A1* | 1/2009 | Harmon ............... G01V 1/42 702/9 |
| 2009/0052277 A1 | 2/2009 | Swanson |
| 2009/0296529 A1 | 12/2009 | Boergen et al. |
| 2010/0100330 A1 | 4/2010 | Burkholder |
| 2010/0195439 A1 | 8/2010 | Muyzert |
| 2010/0202251 A1 | 8/2010 | Ozdemir et al. |
| 2010/0225324 A1 | 9/2010 | Strack et al. |
| 2010/0265797 A1 | 10/2010 | Robertsson et al. |
| 2010/0286922 A1 | 11/2010 | Poletto |
| 2010/0302909 A1* | 12/2010 | Muyzert ............... G01V 1/184 367/178 |
| 2011/0080808 A1 | 4/2011 | Muyzert et al. |
| 2011/0082646 A1 | 4/2011 | Halliday et al. |
| 2011/0082647 A1 | 4/2011 | Edme et al. |
| 2011/0085417 A1 | 4/2011 | Ronnow |
| 2011/0085419 A1 | 4/2011 | Ronnow |
| 2011/0141849 A1 | 6/2011 | Brittan |
| 2011/0242933 A1* | 10/2011 | Maissant ............. G01V 13/00 367/13 |
| 2011/0249530 A1 | 10/2011 | Liu et al. |
| 2012/0026834 A1 | 2/2012 | Muyzert et al. |
| 2012/0035852 A1 | 2/2012 | Edme |
| 2012/0081999 A1 | 4/2012 | Halliday et al. |
| 2012/0113749 A1* | 5/2012 | Edme ................... G01V 1/28 367/38 |
| 2012/0250460 A1* | 10/2012 | Edme ................... G01V 1/364 367/45 |
| 2012/0253680 A1* | 10/2012 | Thompson .......... G01V 11/007 702/13 |
| 2012/0253683 A1* | 10/2012 | Edme ................... G01V 1/303 702/18 |
| 2012/0269033 A1 | 10/2012 | Maples et al. |
| 2013/0315036 A1 | 11/2013 | Paulson et al. |
| 2014/0022861 A1 | 1/2014 | Edme et al. |
| 2014/0219053 A1 | 8/2014 | Goujon et al. |

FOREIGN PATENT DOCUMENTS

| | | |
|---|---|---|
| EP | 1257849 | 1/2009 |
| EP | 1454169 | 11/2013 |
| FR | 2738642 | 3/1997 |
| GB | 1256304 | 12/1971 |
| GB | 2456313 | 7/2009 |
| GB | 2456313 | 5/2010 |
| KR | 20110042276 A | 4/2011 |
| RU | 32290 | 9/2003 |
| WO | 0159482 | 8/2001 |
| WO | 03036331 | 5/2003 |
| WO | 2005017563 | 2/2005 |
| WO | 2010048906 | 5/2010 |
| WO | 2010090949 A3 | 11/2010 |
| WO | 2012015520 A1 | 2/2012 |
| WO | 2013150452 | 10/2013 |

OTHER PUBLICATIONS

Communication issued in related EP Application No. 14746018.2 mailed Feb. 17, 2016 (7 pages).

Extended European Search Report issued in related EP Application No. 15177756.2 mailed Jan. 5, 2016 (7 pages).

Supplementary European Search Report issued in related EP Application No. 14746018.2 mailed Jan. 18, 2016 (3 pages).

Barr, F.J., "Dual-Sensor OBC Technology," The Leading Edge, Jan. 1997, vol. 16(1): pp. 45-51.

Barr, et al., "Attenuation of Water-col. Reverberations Using Pressure and Velocity Detectors in a Water-Bottom Cable," SEG Annual International, Oct. 1989: pp. 1-4.

Criss, "Another look at full-wave seismic imaging," First Break, Jun. 2007, vol. 25: pp. 109-116.

Curtis et al., "Seismic interferometry—turning noise into signal," The Leading Edge, Sep. 2006: pp. 1082-1092.

De Meersman et al., "A Complex SVD-Polarization Filter for Ground Roll Attenuation on Multi-Component Data," EAGE 67th Conference and Exhibition, Jun. 2005: pp. 1-4.

Dey et al., "Noise suppression on Geophone data using microphone measurements", Crewes Research Report, 2000, vol. 12: pp. 1-12 http://www.crewes.org/ForOurSponsors/ResearchReports/2000/2000-08.pdf.

Drijkoningen, "Design of Seismic Network in LOFAR: Testing at Exloo Test-Site," Jul. 2007: pp. 1-53.

Drijkoningen et al., "Project Plan of the Seismic Application in LOFAR," Sep. 2007: pp. 1-16.

Edme et al., "Receiver Function Method in Reflection Seismology," Geophysical Journal International, 2008, vol. 56(3): pp. 327-340.

(56) References Cited

OTHER PUBLICATIONS

Edme, et al., "Receiver Function Decomposition of OBC Data:Theory," Geophysical Journal International, 2009, vol. 177(3): pp. 966-977.

Greensted, "The Lab Book Pages: Delay Sum Beamforming an online collection of electronics information," The Lab Book Pages, Oct. 2012: pp. 1-9, http://www.labbookpages.co.uk/audio/beamforming/delaySum.html.

Halliday et al., "Interferometric surface-wave isolation and removal," Geophysics, Sep.-Oct. 2007, vol. 72 (5): pp. A69-A73.

Digital Sensors, ION Geophysical, 2009, <http://iongeo.com/Land_Imaging/Digital_Sensors> (1 page).

Sensor Geophones, ION Geophysical, 2009, <http://iongeo.com/Land_Imaging/Geophones> (1 page).

Karsli et al., "Using the Wiener-Levison Algorithm to Supress Ground Roll," Journal of Applied Geophysics, Mar. 2004, vol. 55(3-4): pp. 187-197.

Kragh et al., "Ground Roll and Polarization," First Break, Sep. 1995, vol. 13(9): pp. 369-378.

Robertsson et al., "Wavefield Separation using Densely Deployed Three-Component Single-Sensor Groups in Land Surface-Seismic Recordings," Geophysics, Sep. 2002, vol. 67(5): pp. 1624-1633.

Snieder, "Extracting the Green's function of attenuating heterogeneous acoustic media from uncorrelated waves," J. Acoust. Soc. Am., May 2007, col. 121(5): pp. 2637-2643.

Snieder et al., "Cancellation of spurious arrivals in Green's function extraction and the generalized optical theorem," Physical Review E, 2008, vol. 78: pp. 036606-1-036606-8.

Van Dalen et al., "G035: Characterization of Subsurface Parameters with Combined Fluid-Pressure and Particle-Velocity Measurements," 70th EAGE Conference & Exhibition, Jun. 9, 2008: pp. 1-5.

Kennett, "Seismic wave propagation in stratified media," Cambridge University Press, 1983 (5 pages).

Office Action No. 67990 issued in related MX application MX/a/2015/008000 on Aug. 26, 2016, 7 pages.

Office Action issued in related RU application 2015131023 on Apr. 19, 2016, 16 pages.

Decision on Grant issued in related RU application 2015131023 on Jul. 21, 2016, 23 pages.

International Search Report and Written Opinion of PCT Application No. PCT/US2014/013866 dated May 8, 2014.

Anonymous, "428XL Land Seismic Acquisition System," Sercel, 2014: pp. 1-12.

\* cited by examiner

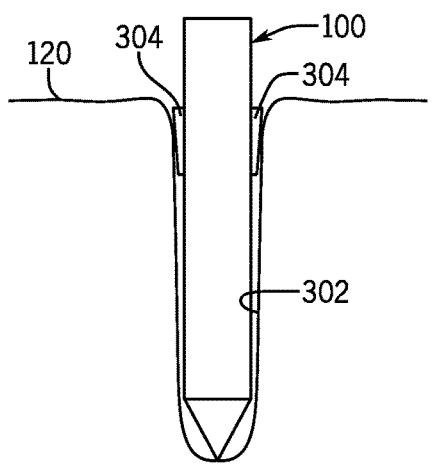 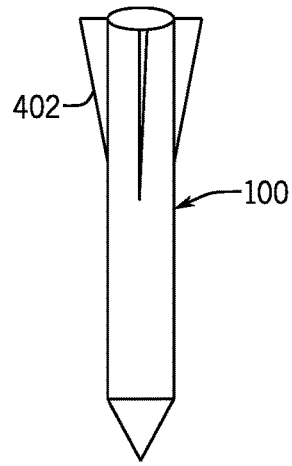
FIG. 3  FIG. 4
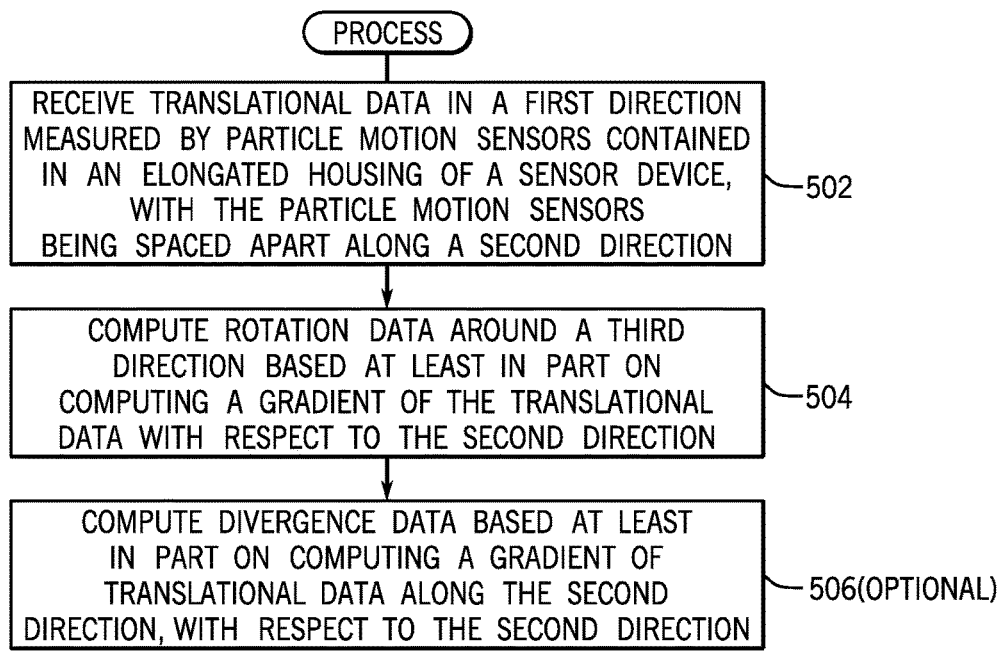
FIG. 5

COMPUTING ROTATION DATA USING A GRADIENT OF TRANSLATIONAL DATA

CROSS REFERENCE TO RELATED APPLICATIONS

This application claims the benefit under 35 U.S.C. §119 (e) of U.S. Provisional Patent Application Ser. No. 61/868,429 filed Aug. 21, 2013; and Ser. No. 61/759,466 filed Feb. 1, 2013; both of which are incorporated herein by reference in their entireties.

BACKGROUND

Seismic surveying is used for identifying subterranean elements of interest, such as hydrocarbon reservoirs, freshwater aquifers, gas injection zones, and so forth. In seismic surveying, seismic sources are activated to generate seismic waves directed into a subterranean structure.

The seismic waves generated by a seismic source travel into the subterranean structure, with a portion of the seismic waves reflected back to the surface for receipt by seismic sensors (e.g., geophones, accelerometers, etc.). These seismic sensors produce signals that represent detected seismic waves. Signals from the seismic sensors are processed to yield information about the content and characteristics of the subterranean structure.

A land-based seismic survey arrangement can include a deployment of an array of seismic sensors on the ground. A marine survey arrangement can include placing a seabed cable or other arrangement of seismic sensors on the seafloor.

SUMMARY

Translational data in a first direction is measured by particle motion sensors contained in an elongated housing of a sensor device provided at an earth surface. The particle motion sensors are spaced apart along a second, different direction along a longitudinal axis of the elongated housing. Rotation data around a third direction is computed based at least in part on computing a gradient of the translational data with respect to the second direction.

Other features will become apparent from the following description, from the drawings, and from the claims.

BRIEF DESCRIPTION OF THE DRAWINGS

Some embodiments are described with respect to the following figures.

FIG. 3 is a schematic diagram of a sensor device partially buried in a hole, according to some implementations.

FIG. 4 is a schematic diagram of a sensor device according to further implementations.

FIG. 5 is a flow diagram of a process according to some implementations.

DETAILED DESCRIPTION

Figure 1:
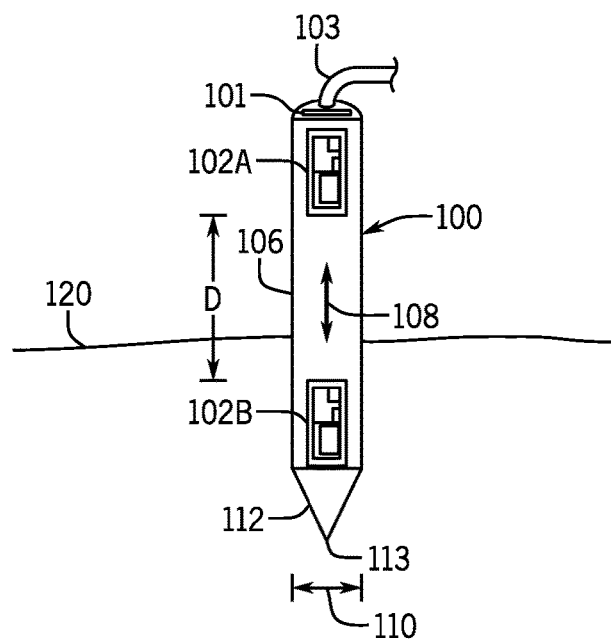
FIG. 1 is a schematic diagram of a sensor device according to some implementations.

In seismic surveying (marine or land-based seismic surveying), seismic sensors are used to measure seismic data, such as displacement, velocity, or acceleration. Seismic sensors can include geophones, accelerometers, microelectromechanical systems (MEMS) sensors, or any other type of sensors that measure translational motion of the surface in one or more directions. In the ensuing discussion, a seismic sensor that measures translational motion is referred to as a particle motion sensor. A particle motion sensor can refer to any of the sensors listed above.

An arrangement of particle motion sensors can be provided at (or proximate) a ground surface or earth surface to measure seismic waves reflected from a subterranean structure, in response to seismic waves (or impulses) produced by one or more seismic sources and propagated into an earth subsurface. As described herein a ground surface and/or earth surface is any land surface or bottom surface of a body of water, such as a seafloor, lake floor or wetland. A particle motion sensor provided at a ground surface can refer to a particle motion sensor that is placed in contact with the ground surface, partially buried in the ground surface, or completely buried in the ground surface up to a predetermined depth (e.g., up to a depth of less than 5 meters). A particle motion sensor at (or proximate) the earth surface can record the vectorial part of an elastic wavefield just below the free surface (i.e., ground surface).

In addition to measuring translational data, it may be useful to obtain rotation data when performing survey data acquisition for various purposes. For example, rotation data can be combined with translational data measured by particle motion sensors to eliminate or attenuate noise from the measured translational data. Examples of noise include ground-roll noise or another type of noise (such as ambient noise) that can travel along the earth's surface. Ground-roll noise can be produced by a seismic source or other source, such as cars, engines, pumps, and natural phenomena such as wind and ocean waves. The ground-roll noise travels generally horizontally along an earth surface towards seismic receivers. The horizontally traveling seismic waves, such as Rayleigh waves or Love waves, are undesirable components that can contaminate seismic survey data.

Although reference is made to using rotation data to attenuate noise, it is noted that rotation data can be used for other purposes, whether in the context of a land-based survey acquisition or marine-based survey acquisition in which a seabed cable or other arrangement of seismic sensors is placed on the seafloor. For example, rotation data and translational data can be used in performing various seismic data processing algorithms, including, among others, wavefield interpolation, wavefield extrapolation, wavefield reconstruction, wavefield regularization, P- and S-wave separation, apparent velocity estimation, near-surface characterization, seismic sensor calibration, and seismic imaging.

Wavefield interpolation refers to estimating (interpolating) wavefields at locations where seismic sensors are not provided. P- and S-wave separation refers to separating compressional (P) waves from shear (S) waves in measured seismic survey data. Apparent velocity estimation refers to estimating a characteristic of the seismic wavefield known as ray parameter or horizontal slowness, from which seismic wave velocities at various points in a subterranean structure can be retrieved. Near-surface characterization refers to estimating the shallow earth elastic properties. Seismic sensor calibration refers to calibrating a seismic sensor to compensate for any non-ideal characteristic of the seismic sensor.

Rotation data refers to a rate of rotation (or change in rotation over time) about a specific axis, such as about the x axis (which can also be referred to as a horizontal inline axis) and/or about the y axis (which can also be referred to as a horizontal crossline axis). In accordance with some implementations, rotation data can be derived based on translational data measured by particle motion sensors. In this way, a separate rotational sensor would not have to be provided in survey equipment for the purpose of measuring rotation data.

FIG. 1 depicts an example seismic sensor device 100 that includes a first sensor component 102A and a second sensor component 102B. The sensor components 102A and 102B are included inside a single housing 106 of the sensor device 100. The seismic sensor device 100 can also include a power source, such as a battery, a solar cell, and so forth. In manufacturing the seismic sensor device 100, the housing 106 can be sealed to protect the sensor components 102A and 102B.

The housing 106 generally has an elongated shape that allows the sensor components 102A and 102B to be spaced apart along a longitudinal axis 108, by a distance D, of the sensor device 100. In some implementations, the sensor components 102A and 102B are co-axial along the longitudinal axis of the housing 106. The elongated housing 106 can be in the form of a hollow tube, stick, or other elongated structure. The longitudinal axis 108 is the axis along a dimension of the sensor device 100 which is longer than other dimensions of the sensor device 100, such as a width dimension 110 or a depth dimension (not shown) that corresponds to a thickness of the housing 106.

The sensor device 100 having the elongated housing 106 can be referred to as a spike-shaped sensor device.

The housing 106 can be made out of a material, such as plastic, metal, and so forth. According to an example embodiment, the housing 106 may not resonate within a bandwidth of interest for target signals to be measured. In some examples, the bandwidth of interest can be in the range between 1 to 250 Hertz (Hz). In other examples, the housing 106 may exhibit resonance; in such examples, the resonance can be removed by processing, or the resonance can be compensated for by processing.

By arranging the sensor components 102A and 102B in the elongated housing 106 as shown in FIG. 1, the sensor components 102A and 102B are spaced apart along just the longitudinal axis 108. In other words, in some implementations, the sensor device 100 does not include sensor components that are spaced apart in any other direction (other than a direction parallel to the longitudinal axis).

FIG. 1 shows a portion of the sensor device 100 (not to scale) being below the ground surface 120, and a portion of the sensor device 100 being above the ground surface 120. According to an embodiment, the configuration can include a sensor 102B below the ground surface and a sensor 102A above the ground surface. A sensor can also be positioned at or proximate the ground surface 120. According to an embodiment, a majority of the sensor device 100 can be below the ground surface 120. According to another embodiment a majority of the sensor device 100 can be above the ground surface 120. Another embodiment can have approximately half the sensor device 100 above and half the sensor device 100 below the ground surface 120. Another embodiment can have all of the sensor devices 100 (or essentially all the sensor devices 100) below the ground surface 120.

In some examples, to obtain rotation data with respect to a horizontal axis at a ground surface 120, two vertically spaced horizontal orientated particle motion sensors can be provided in the sensor device 100. The sensor device 100 can then be vertically arranged at or near the ground surface 120. It should be understood that additional sensors to 102A and 102B can be located along the length of the sensor device 100 to provide redundancy for failed sensors and/or additional measurements.

The sensor device 100 can include a communication interface circuit 101, which is connected to a communications medium 103 (e.g., electrical cable, fiber optic cable, etc.,). The communications medium 103 can be a wireless medium over which data can be communicated. The communication interface circuit 101 is connected to the sensor components 102A and 102B. Data acquired by the sensor components 102A and 102B are transferred to the communication interface circuit 101, which in turn transmits the acquired data over the communications medium 103 to a remote station, which can be a recording station, a computer, and so forth. According to other embodiments, a memory can be provided and incorporated with the sensor device 100. The memory can also be separate from the sensor device 100 and connected by wire, or short range wireless technology such as Wi-Fi or Bluetooth. An arrangement where memory is included can be referred to in the commercial art as a "blind" node arrangement. In this "blind" node arrangement, a communications interface circuit 101 may not have to be present. It should also be appreciated that a combination of a "blind" node arrangement and a wired node and/or a wireless node arrangement can be used.

In further implementations, the sensor device 100 may contain a sensing element (or sensing elements) to measure a tilt and/or an azimuth of the sensor device 100, where tilt is measured with respect to the z axis. This sensing element (s) can be part of the sensor components 102A and 102B that measure translation and rotation. For example, if the sensor components 102A and 102B include MEMS accelerometers that measure down to DC, then the MEMS accelerometers can provide tilt data. If the sensor components 102A and 102B include geophones, then a tilt meter can be added. An azimuth sensor (e.g., magnetometer, compass) can be added, so that measured horizontal components (e.g., translational data or rotation data in the x or y axis) can be rotated with respect to a global reference. If an azimuth sensor is not provided, then the sensor device 100 can be oriented azimuthally to a predefined azimuth when the sensor device 100 is planted.

Also, control circuitry (not shown) can be included in the sensor device 100 to control the particle motion sensors. Additionally, an analog-to-digital converter and other components may be included, such as in the communication interface circuit 101, to convert signals measured by the particle motions sensors into digital form. The components in the sensor device 100 may be powered by a battery, a solar panel, or through a wired or wireless connection.

The bottom portion of the sensor device 100 may include a spike 112 for driving the sensor device 100 into the ground surface 120. The spike 112 has a generally sharp tip 113 that allows for easier insertion of the sensor device 100 into the ground surface 120 to form a connection between the earth and the sensor device 100. A user or machine can push the spike 112 into the ground surface 120 to cause at least a portion of the sensor device 100 to be buried in the earth beneath the ground surface 120. For example, the sensor device 100 can be driven into the ground surface using a hammer, either by a user or in an automated manner by a machine. In different examples, the sensor device 100 can be screwed into the ground by a wrench or planted in a prepared borehole with reduced disturbance of the surrounding earth. As another example, a borehole may be dug and the sensor device 100 may be placed therein. The borehole may be refilled after positioning the sensor device 100. Instead of using the spike 112, the housing 106 of the sensor device 100 can have a V or screw shape to facilitate planting into the ground surface 120 (protrusions can be formed on the outer wall of the housing 106 in the form of a helical screw).

In some cases, the sensor device 100 is partially buried beneath the ground surface 120, with a portion of the sensor device 100 protruding above the ground surface 120. In other cases, the sensor device 100 can be completely buried in the ground surface, up to a predetermined depth (as discussed above).

In some examples, the sensor components 102A and 102B are sensor chips. A sensor chip refers to an integrated circuit device that includes a substrate (e.g., semiconductor substrate) on which particle motion sensors can be provided. For example, the particle motion sensors that can be provided in the sensor chip 102A or 102B can include MEMS particle motion sensors, such as MEMS accelerometers. A MEMS particle motion sensor can include a micro element (e.g., a micro cantilever) that is moveable in response to particle motion, where the movement of the micro element can be detected by a sensing element. In other examples, the sensor components 102A and 102B can include other types of particle motion sensors. It should be noted that the MEMS particle motion sensors do not have to be on the "chip," but that is an option. An example of a MEMS and electronics configuration is disclosed in U.S. Patent Application Publication No. 2013/0315036.

In some implementations, the particle motion sensors that are provided in the sensor component 102A or 102B can measure translational data in multiple directions, such as the x, y and z directions. Examples of such arrangements are shown in FIGS. 2A and 2B, where the sensor component 102A or 102B includes a respective z sensor 202A or 202B (for measuring translational data along the z axis), a respective x sensor 204A or 204B (for measuring translational data along the x axis), and a respective y sensor 206A or 206B (for measuring translational data along they axis).

Figures 2A, 2B, 2C:
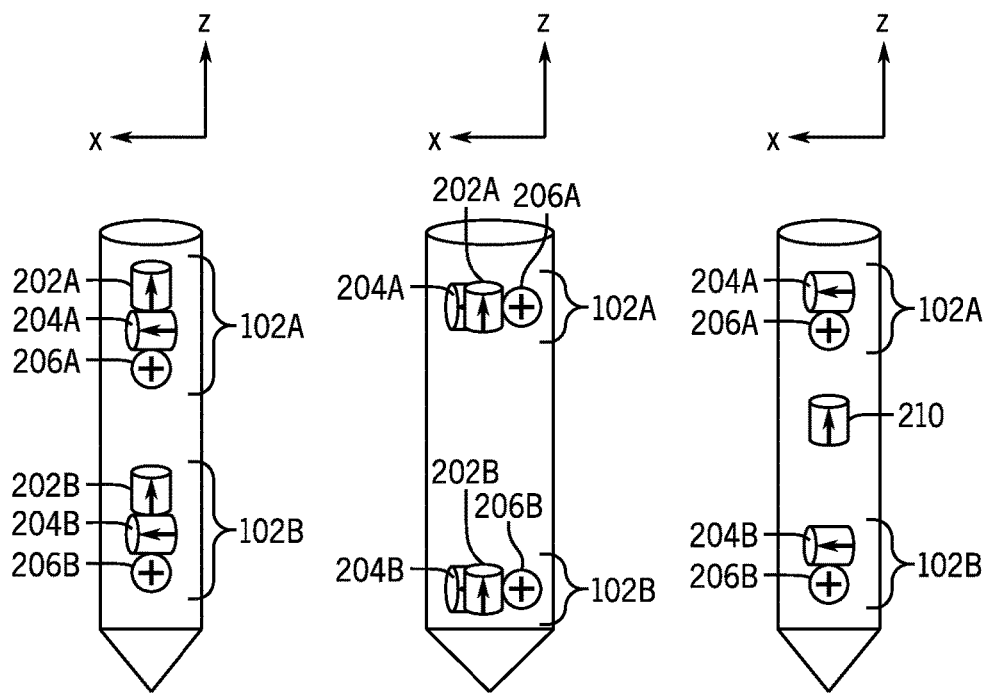
FIGS. 2A-2C are schematic diagrams of a sensor device according to various implementations.

In further examples, such as shown in FIG. 2C, the sensor component 102A or 102B can include just a respective x sensor 204A or 204B and a respective y sensor 206A or 206B. In the arrangement of FIG. 2C, a separate z sensor 210 can be provided for measuring translational data along the z direction. The z sensor 210 can be positioned in the middle between sensor components 102A and 102B. In other examples, the z sensor 210 can be positioned elsewhere, such as in either 102A or 102B. In some implementations, a pair of sensors (e.g., 204A and 204B, or 206A and 206B, or 202A and 202B) can be hardwired together to provide the sum and the difference as outputs. The sum can help reduce the non-correlated noise (between the elements of a pair) and the difference provides a gradient.

In other implementations, the sensor component 102A can include particle motion sensors to measure in just the x and y axes, while the sensor component 102B can include particle motion sensors to measure the x, y and z axes, and vice versa Note that the particle motion sensors in a given component (e.g., 102A) within the same sensor device 100 do not have to be orientated in the same direction as the other sensor component (e.g., 102B). If the relative angle between the sensor components 102A and 102B is known, then the measured data by the pair of particle motion sensors can be corrected using vector rotation.

As shown in FIG. 3, a driving action on the sensor device 100 (e.g., repeated hammer impacts on the sensor device 100) drives the sensor device 100 into a hole 302 extending from the ground surface 120. The driving action on the sensor device 100 may have caused the hole 302 to widen near the earth surface 302. The widening of the hole 302 near the earth surface 300 may cause resonances in the sensor device 100 that may be observed in measured seismic survey data. Such resonances can be reduced by enhancing the coupling of the sensor device 100 with the surrounding earth. This can be achieved by inserting wedges 304 into a gap between the sensor device 100 and the surrounding earth.

In other implementations, as shown in FIG. 4, the sensor device 100 can be provided with wings or fins 402 (e.g., vertical fins), which allows the upper portion of the sensor device 100 to be coupled to the surrounding earth when the sensor device 100 is driven into the hole 302 (FIG. 3). In further implementations, a hole can be dug, the sensor device 100 is positioned in the hole, and the hole is backfilled to provide good coupling. In other implementations, a coupling device can first be planted or buried into the ground, and the sensor device 100 can then be engaged with the coupling device.

The rotation data in the three spatial axes (k=x, y, z) is given by:

$$R_k = \frac{1}{2}\left[\frac{\partial v_i}{\partial j} - \frac{\partial v_j}{\partial i}\right], \tag{Eq. 1}$$

where $v_i$ represents the particle velocity along the i (i=x, y, z) axis, and $v_j$ represents particle velocity along the j (j=x, y, z) axis. In the foregoing nomenclature, the i axis is orthogonal with respect to the j axis, and both the i and j axes are orthogonal with respect to the k axis. The gradient $$\frac{\partial v_i}{\partial j}$$

represents a spatial derivative of $v_j$ with respect to the j axis, and the gradient $$\frac{\partial v_j}{\partial i}$$

represents a spatial derivative of $v_j$ with respect to the i axis. The particle velocity measurements can be made at or just under the ground surface 120 (FIG. 1). At or just under the ground surface 120, the following relationships for deriving rotation data along the x and y axis may apply:

$$R_y = -\frac{\partial v_z}{\partial x} = +\frac{\partial v_x}{\partial z}, \tag{Eq. 2}$$

$$R_x = \frac{\partial v_z}{\partial y} = -\frac{\partial v_y}{\partial z}, \tag{Eq. 3}$$

where $v_x$ represents particle velocity along the x direction, $v_y$ represents particle velocity along the y direction, and $v_z$ represents particle velocity along the z direction. This implies that the rotation components around a horizontal axis, $R_y$ or $R_x$, can be derived by measuring just one of the terms in the right hand side of Eq. 2 or 3.

Although reference is made to deriving rotation data based on measured velocities in the foregoing examples, it is noted that other types of translational data, including displacement or acceleration data, can be used for obtaining rotation data in a manner similar to that described in connection with Eqs. 2 and 3 above.

A characteristic of providing the sensor device 100 at the ground surface 120 (or free surface between the air and a solid or between the water and a solid) is that a spatial gradient and rotation become equivalent to one another, as expressed by Eq. 2 or 3.

By taking advantage of such characteristic when the sensor device is provided at the ground surface 120, measurements of the vertical gradient of horizontal translational data in a spike-shaped sensor device can be used to obtain the rotation data. A vertical gradient refers to a gradient taken with respect to the z axis. Horizontal translation data refers to translational data along the x or y axis. The vertical gradient of horizontal translational data can be expressed as $$\frac{\delta v_x}{\delta z} \text{ or } \frac{\delta v_y}{\delta z},$$

for example.

In the example arrangement of FIG. 1, the foregoing vertical gradients of horizontal translational data can be obtained using measurements of closely spaced apart x sensors 204A and 204B, or closely spaced apart y sensors 206A and 206B.

In addition to obtaining rotation data using measurements of translational data by particle motion sensors, divergence data can also be derived using the translational data, in accordance with further implementations.

The divergence of a wavefield, ∇·V, can be represented as:

$$\nabla \cdot V = \sum_{i=1}^{3} \frac{\partial v_i}{\partial i}. \quad \text{(Eq. 4)}$$

In Eq. 4, i=(x, y, z) represent the three orthogonal axes. At the free surface, Eq. 4 is expressed as:

$$\nabla \cdot V = \frac{2\mu}{\lambda + 2\mu}\left(\frac{\partial v_x}{\partial x} + \frac{\partial v_y}{\partial y}\right) = -\frac{2\mu}{\lambda}\left(\frac{\partial v_z}{\partial z}\right), \quad \text{(Eq. 5)}$$

Eq. 5 indicates that, at the free surface, the divergence of a wavefield, can be measured by just one partial derivative term $$\left(\frac{\partial v_z}{\partial z}\right).$$

In Eq. 5 parameters µ and λ are Lame parameters. The ratio of the Lame parameters µ and λ is a function of the near-surface P- and S-wave velocities α and β:

$$\frac{\mu}{\lambda} = \frac{\beta^2}{\alpha^2 + \beta^2}. \quad \text{(Eq. 6)}$$

The partial derivative in the right-hand side of Eqs. 2, 3, and 5 can be measured by differentiating measurements from closely spaced apart particle motion sensors, such as closely spaced apart particle motion sensors depicted in FIG. 1. In some examples, the particle motion sensors are spaced apart along the longitudinal axis 108 by a distance D that is less than or equal to about 0.3 times a wavelength of a target signal for measurement by the sensor device 100. In further examples, the particle motion sensors are spaced apart along the longitudinal axis 108 by a distance D that is less than or equal to about 0.1 times a wavelength of a target signal for measurement by the sensor device 100. Note that the foregoing distances D between the particle motion sensors are applicable to computing the rotation data according to Eqs. 2 and 3 and/or the divergence data according to Eq. 5.

To achieve greater accuracy in computing rotation data and/or divergence data as discussed above based on measured translational data, the particle motion sensors are selected or configured such that the impulse responses of the particle motions sensors within the same sensor device 100 are similar to one other to within a specified threshold difference of one other. This may be achieved by selecting matching pairs of particle motion sensors, or by applying calibration coefficients to measurement data acquired by the particle motion sensors.

FIG. 5 is a flow diagram of a process according to some implementations. The process of FIG. 5 can be performed by a computer system that receives measurements made by one or more sensor devices 100. For example, the computer system may be coupled to the one or more sensor devices 100 over the communications medium 103.

The computer system receives (at 502) translational data in a first direction (e.g., x or y direction) measured by particle motion sensors contained in the elongated housing 106 (FIG. 1) of the sensor device 100. The particle motion sensors are spaced apart along a second, different direction (e.g., z direction) along the longitudinal axis 108 (FIG. 1) of the elongated housing 106.

The computer system computes (at 504) rotation data around a third direction (e.g., y or x direction) based at least in part on computing a gradient of the translational data with respect to the second direction, such as according to Eq. 2 or 3 set forth above.

In some examples, the computer system can also compute (at 506) divergence data based at least in part on computing a gradient of translational data along the second direction, with respect to the second direction, such as according to Eq. 5 above.

As shown in FIG. 2A or 2B, in some implementations, the sensor device 100 can include two sets (102A, 102B) of three orthogonally oriented particle motion sensors. This configuration allows computation of the two orthogonal rotation components, $R_x$ and $R_y$, around respective horizontal axes x and y. The particle motion sensors of the set may be positioned with a very small vertical separation inside the sensor device 100 (as discussed above). The separation between the sets of particle motion sensors may not have to be the same for different directions (e.g., x and y direction), so long as the different separations are known.

Using the sensor device 100 of FIG. 2A or 2B, the following data can be obtained: translational data (including $v_x$, $v_y$, $v_z$), rotation data (including $R_x$, $R_y$), and divergence data (∇·V). With the sensor device 100 of FIG. 2C, the same types of data can be obtained, except the divergence data. The foregoing data can be transmitted over the communications medium 103 (FIG. 1) to a station.

In some examples, to obtain more accurate estimates of the translational data, translational data measurements in a given direction obtained by a pair of particle motion sensors for the given direction can be aggregated (e.g., summed, averaged, etc.,). For example, as shown in FIG. 2A or 2B, the translational data measurements by the z sensors 202A and 202B can be aggregated to obtain a better estimate of the wavefield in the z direction, where this estimate is centered at the same depth as the obtained rotation data and divergence. Similarly, the translational data measurements by the x sensors 204A and 204B can be aggregated (at a computer system) to obtain a better estimate of the wavefield in the x direction, and the translational data measurements by the y sensors 206A and 206B can be aggregated (at the computer system) to obtain a better estimate of the wavefield in the y direction.

In some examples, the separation (D in FIG. 1) between the sets of particle motion sensors in the sensor device is between one centimeter and one meter. More specifically, the separation, D, can be between 5 centimeters and 50 centimeters, although other ranges are possible, such as on the order of centimeters.

The amplitude of the difference signal (difference between the translational data acquired by a first particle motion sensor and the translational data acquired by a second particle motion sensor, computed for determining the partial derivative in Eq. 2, 3, or 5) may be relatively small compared to the raw particle motion sensor output, because of the relatively small distance between the two particle motion sensors. To allow for an accurate determination of the rotation data and/or divergence data according to some implementations, the particle motion sensors used in a pair should be well matched in terms of phase and amplitude frequency response. In some examples, MEMS particle motion sensors may be well suited for some implementations, since they have a zero (or close to zero) phase response, and their amplitude response is flat at different frequencies.

In addition, MEMS particle motion sensors may be able to measure gravity, which can be used to calibrate the sensitivities of the MEMS particle motion sensors. As a result, use of MEMS particle motion sensors may lead to more accurate computation of partial derivatives of translational data, such as those computed in Eq. 2, 3, or 5.

Use of MEMS particle motion sensors may also allow the sensor device 100 to have a reduced size, as compared to a sensor device that uses another type of particle motion sensors, such as geophones. A smaller sensor device 100 is easier to deploy.

To improve the accuracy of divergence data obtained by differentiating closely spaced z particle motion sensors, such as according to Eq. 5, the z particle motion sensors (e.g., 202A and 202B in FIG. 2A or 2B) within the same sensor device 100 can be seismically decoupled. Seismically decoupling z particle motion sensors may be achieved by placing a damper between the two sensors, such as by placing a material, such as rubber or other dampening material, between the sensors that serve to attenuate the seismic signals that propagate in the longitudinal axis 108 (FIG. 1) of the sensor device 100. Also, to achieve improved accuracy in obtaining divergence data, the pair of z particle motion sensors in the sensor device 100 are matched or calibrated to have almost identical amplitude and phase responses.

As noted above, in some implementations, a sensor device 100 can include a sensing element (e.g., a tilt meter) to measure a tilt of the sensor device 100 with respect to the z axis (vertical axis). A deviation from the vertical axis can be measured in two directions using tilt meters, or can be derived from the DC component for the particle motion sensor measurements. If the sensor device 100 is not oriented vertically (i.e., its longitudinal axis 108 is tilted from the z axis by more than a predefined angle), then measurements by the particle motion sensors of the sensor device 100 are corrected for the tilt.

Moreover, the orientation of the horizontal (x or y) particle motions sensors with respect to geographical north (or any other horizontal azimuth) can be measured with a built in magnetometer or compass whose readings are recorded and transmitted once or multiple times during a survey. In other examples, the azimuth can be measured during or after planting of the sensor device 100, or derived from the measured translational data. The measured translation data from the horizontal particle motion sensors can be mathematically rotated using the measured azimuth angle.

Figure 6:
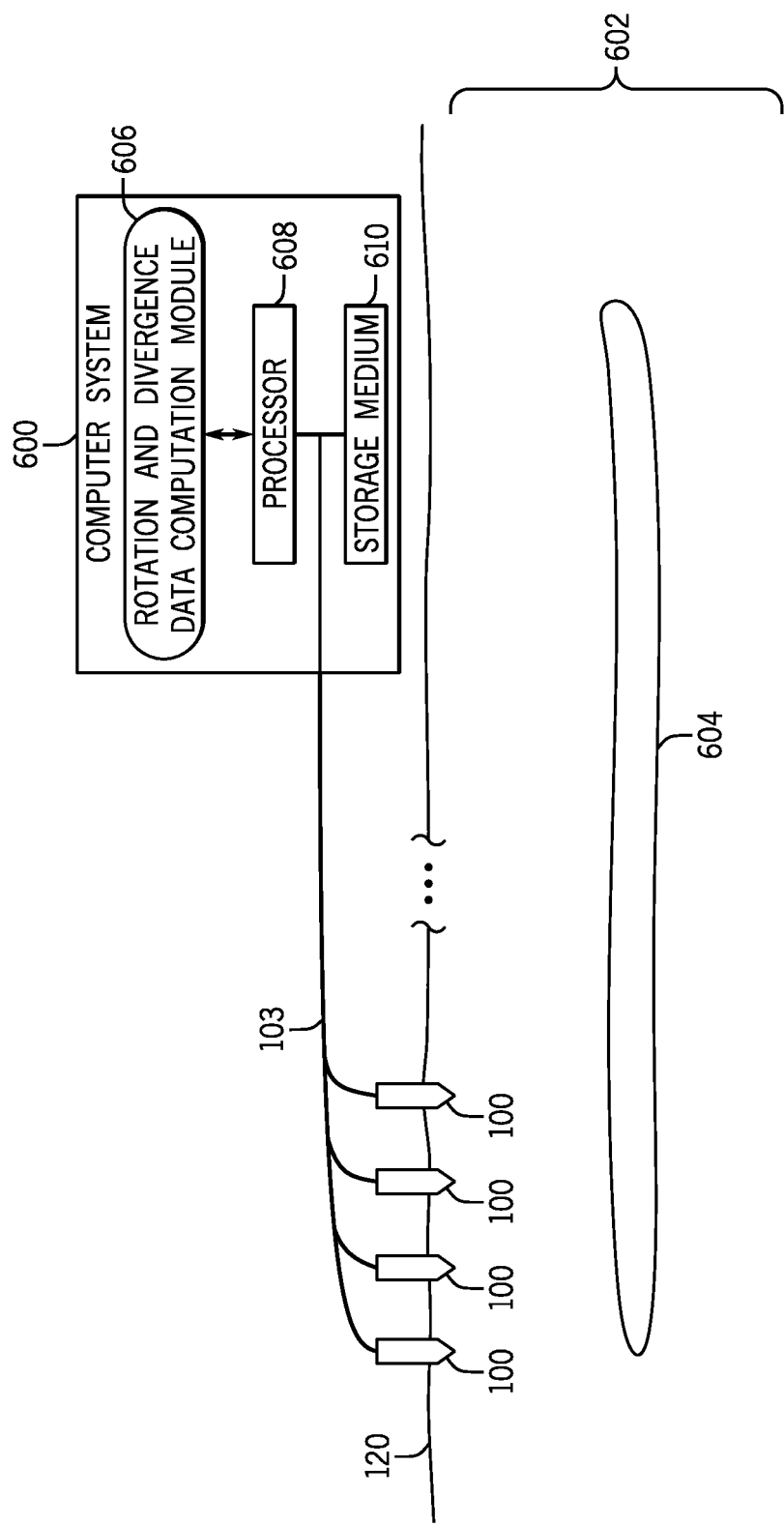
FIG. 6 is a schematic diagram of an example survey arrangement including sensor devices according to some implementations.

FIG. 6 is a schematic diagram of a land-based survey arrangement (including a seismic sensor system) that includes sensor devices 100 according to some implementations. In different examples, the sensor devices 100 can be deployed in a marine survey arrangement.

Measurements acquired by the sensor devices 100 are transmitted to a computer system 600, where the measurements are recorded (stored in a storage medium or storage media 610). In some examples, each sensor device 100 (or at least one of the sensor devices 100) can include the computer system 600, or at least one or more processors 608 and storage medium (or storage media) 610. The measurements are made by the sensor devices 100 in response to seismic waves produced by one or more seismic sources (not shown). The seismic waves are propagated into a subterranean structure 602, and reflected from a subterranean element 604 of interest. The reflected waves are detected by the sensor devices 100.

The computer system 600 includes a rotation and divergence data computation module 606, which can be implemented with machine-readable instructions that are executable on one or more processors 608. The rotation and divergence data computation module 606 can compute rotation data and divergence data as discussed above.

The processor(s) 608 can be coupled to the storage medium (or storage media) 610, which can store data, such as translational data received from the sensor devices 100.

The storage medium (or storage media) 610 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method of seismic surveying, comprising:
   actuating a seismic source to transmit impulses into an earth subsurface;
   receiving, by a seismic sensor system, translational data in a first direction measured by particle motion sensors contained in an elongated housing of a seismic sensor device provided at a ground surface, wherein at least one of the particle motion sensors is proximate the ground surface, the particle motion sensors spaced apart along a second, different direction along a longitudinal axis of the elongated housing, and receiving translational data in a third direction measured by additional particle motion sensors in the elongated housing, the translational data in the first and third directions corresponding at least partially to the impulses; and
   recording the translational data in the first direction and the translational data in the third direction, wherein for the translational data in the first direction and the translational data in the third direction that are measured by the particle motion sensors where at least one of the particle motion sensors is proximate the ground surface, a relationship applies where a rotation data around the third direction is based on a gradient of the translational data in the first direction with respect to the second direction, and a rotation data around the first direction is based on a gradient of the translational data in the third direction with respect to the second direction.

2. The method of claim 1, wherein the at least one of the particle motion sensors proximate the ground surface records a wavefield just below the ground surface, the method further comprising:
   approximating the rotation data around the third direction as the gradient of the translational data in the first direction with respect to the second direction; and
   approximating the rotation data around the first direction as the gradient of the translational data in the third direction with respect to the second direction.

3. The method of claim 1, further comprising placing the seismic sensor device at the ground surface using automatic placement equipment to drive a portion of the seismic sensor device into the ground surface.

4. The method of claim 1, wherein the seismic sensor device is without any particle motion sensors spaced apart along any direction different from the second direction.

5. The method of claim 1, wherein the particle motion sensors are spaced apart along the second direction by a distance that is less than a wavelength of a target signal for measurement by the seismic sensor device.

6. The method of claim 1, wherein the particle motion sensors are spaced apart along the second direction by a distance that is less than or equal to 0.3 times a wavelength of a target signal for measurement by the seismic sensor device.

7. The method of claim 1, wherein the particle motion sensors are spaced apart along the second direction by a distance that is less than or equal to 0.1 times a wavelength of a target signal for measurement by the seismic sensor device.

8. The method of claim 1, wherein the second direction is a vertical direction, and wherein the first and third directions are horizontal directions, the first direction being orthogonal with respect to the third direction.

9. The method of claim 1, further comprising:
   computing divergence data based at least in part on computing a gradient of translational data in the second direction with respect to the second direction.

10. The method of claim 1, wherein receiving the translational data comprises receiving the translational data measured by the particle motion sensors provided on integrated circuit chips in the seismic sensor device.

11. The method of claim 10, wherein the particle motion sensors include microelectromechanical systems (MEMS) sensors.

12. The method of claim 1, wherein one of the particle motion sensors is located below the ground surface and another one of the particle motion sensors is located above the ground surface.

13. The method of claim 1, wherein the particle motion sensors are below the ground surface.

14. The method of claim 1, wherein the rotation data around the third direction is a rate of rotation around the third direction, and the rotation data around the first direction is a rate of rotation around the first direction.

15. The method of claim 1, wherein the relationship specifies that a magnitude of the rotation data around the third direction is equal to a magnitude of the gradient of the translational data in the first direction with respect to the second direction, and that a magnitude of the rotation data around the first direction is equal to a magnitude of the gradient of the translational data in the third direction with respect to the second direction.

16. The method of claim 15, further comprising transmitting, by the seismic sensor device, the translational data in the first and third directions to a system to compute the rotation data around the first and third directions.

17. The method of claim 1, wherein the relationship specifies that the rotation data around the third direction is equal to the gradient of the translational data in the first direction with respect to the second direction, and that the rotation data around the first direction is equal to a negative of the gradient of the translational data in the third direction with respect to the second direction.

18. The method of claim 1, further comprising placing the seismic sensor device at the ground surface by driving a spike at a bottom portion of the seismic sensor device into the ground surface.

19. The method of claim 1, wherein the elongated housing comprises a hollow tubular structure, and wherein the particle motion sensors are contained completely within the hollow tubular structure.

20. The method of claim 19, wherein the hollow tubular structure includes protrusions in the form of a helical screw on an outside of the hollow tubular structure.

21. The method of claim 19, wherein the hollow tubular structure includes protrusions on an outside of the hollow tubular structure that form vertical fins.

22. An article comprising at least one non-transitory machine-readable storage medium storing instructions that upon execution cause a system to:

receive translational data in a first direction measured by particle motion sensors contained in an elongated housing of a sensor device provided at a ground surface, wherein at least one of the particle motion sensors is proximate the ground surface, the particle motion sensors spaced apart along a second, different direction along a longitudinal axis of the elongated housing; and compute rotation data around a third direction that is approximated as a gradient of the translational data with respect to the second direction.

23. The article of claim 22, wherein the instructions upon execution cause the system to further:

correct the translational data for at least one of a tilt angle and an azimuth angle of the sensor device.

24. The article of claim 22, wherein the translational data is received from the particle motion sensors that are spaced apart along just the second direction, without being spaced apart in a different direction.

25. The article of claim 22, wherein the second direction is a vertical direction, and the first and third directions are horizontal directions.

26. The article of claim 22, wherein the particle motion sensors are spaced apart along the second direction by a distance that is less than or equal to 0.3 times a wavelength of a target signal for measurement by the sensor device.

27. The article of claim 22, wherein the instructions upon execution cause the system to further:

compute divergence data based at least in part on computing a gradient of translational data in the second direction with respect to the second direction.

28. The article of claim 22, wherein the instructions upon execution cause the system to further:

using the rotation data and translational data, perform at least one selected from the group consisting of noise attenuation, wavefield interpolation, regularization, reconstruction, P- and S-wave separation, near-surface characterization, velocity estimation, sensor calibration, and seismic imaging.

29. A method of seismic surveying, comprising:

placing a seismic sensor device at a ground surface, wherein the seismic sensor device comprises an elongated housing, wherein a first seismic sensor is contained inside the elongated housing and is connected with the elongated housing, and a second seismic sensor is contained inside the elongated housing and is connected with the elongated housing, the first and second seismic sensors comprising particle motion sensors, wherein at least one of the first and second seismic sensors is proximate the ground surface, the first seismic sensor and the second seismic sensor being separated from one another by a distance along the elongated body, the first seismic sensor detecting three-axis translational movement, and the second seismic sensor detecting at least two-axis translational movement, the first and second seismic sensors having one axis that is co-axial with one another;

receiving a first direction translational data; and receiving a second direction translational data, wherein for the first direction translational data and the second direction translational data that are measured by the particle motion sensors where at least one of the particle motion sensors is proximate the ground surface, a relationship applies where a rotation data around the second direction is based on a gradient of the first direction translational data with respect to a longitudinal axis of the elongated housing, and where a rotation data around the first direction is based on a gradient of the second direction translational data with respect to the longitudinal axis.

30. The method of claim 29, wherein the first and second seismic sensors are contained completely within the elongated housing.

31. The method of claim 30, wherein placing the seismic sensor device at the ground surface comprises driving a spike at a bottom portion of the seismic sensor device into the ground surface.

32. The method of claim 29, wherein the relationship specifies that a magnitude of the rotation data around the second direction is equal to a magnitude of the gradient of the first direction translational data with respect to the longitudinal axis, and a magnitude of the rotation data around the first direction is equal to a magnitude of the gradient of the second direction translational data with respect to the longitudinal axis.

33. A method of processing seismic data that is obtained by placing a seismic sensor system at least partially into a ground surface, the seismic sensor system including a processor, the method comprising:

receiving, by the seismic sensor system, translational data in a first direction measured by particle motion sensors contained in an elongated housing of a sensor device provided at the ground surface, wherein at least one of the particle motion sensors is proximate the ground surface, the particle motion sensors spaced apart along a second, different direction along a longitudinal axis of the elongated housing, and receiving translational data in a third direction measured by additional particle motion sensors in the elongated housing, the translational data in the first and second directions corresponding at least partially to impulses produced by actuation of a seismic source and transmitted into an earth subsurface;

recording the translational data in the first direction and the translational data in the third direction; and calculating rotation data around the third direction that is approximated as a gradient of the translational data in the first direction with respect to the second direction.

34. The method of claim 33, further comprising processing translational data with the rotation information to reduce noise.

35. The method of claim 33, further comprising calculating rotation data around the first direction that is approximated as a negative of a gradient of the translational data in the third direction with respect to the second direction.

* * * * *